United States Patent [19]

Smith et al.

[11] Patent Number: 4,924,629

[45] Date of Patent: May 15, 1990

[54] ROLLING DIAPHRAGM SYSTEM FOR DEFLATING WEATHERSTRIPS

[75] Inventors: Jack E. Smith, Dayton; Mark G. Pfeiffer, W. Alexandria, both of Ohio

[73] Assignee: General Motors Corporation, Detroit, Mich.

[21] Appl. No.: 329,173

[22] Filed: Mar. 27, 1989

[51] Int. Cl.$^5$ .............................................. E06B 7/16
[52] U.S. Cl. .................................................... 49/477
[58] Field of Search .................. 49/477, 498; 417/472; 220/232

[56] References Cited

U.S. PATENT DOCUMENTS

| | | | |
|---|---|---|---|
| 2,003,614 | 6/1935 | Shetzline | 49/477 |
| 3,110,065 | 11/1963 | Dennis | 49/477 |
| 4,761,917 | 8/1988 | Knecht et al. | 49/477 |
| 4,805,347 | 2/1989 | Smith | 49/477 |

*Primary Examiner*—Kenneth J. Dorner
*Assistant Examiner*—Gerald A. Anderson
*Attorney, Agent, or Firm*—R. L. Phillips

[57] ABSTRACT

A deflatable sealing member forms a weatherstrip to seal a closure opening for a vehicle. The sealing member includes a sealed tubular section to provide tight interference engagement between the closure and the vehicle body. A rolling diaphragm pump deflates the sealing member during closing of the closure. Upon deflation, the sealing member collapses to a reduced cross section. This permits easier closing of the closure and avoids compression shock, common on vehicles having tight fitting weatherstriping. An atmospheric vent valve vents the sealing member to the atmosphere upon closing. As a result, the inherent resiliency of the sealing member returns it to full cross section, restoring the desired tight interference engagement. A vacuum limiter valve is provided to limit the level of vacuum within the pump in order to maintain the closing force below a desired maximum.

3 Claims, 3 Drawing Sheets

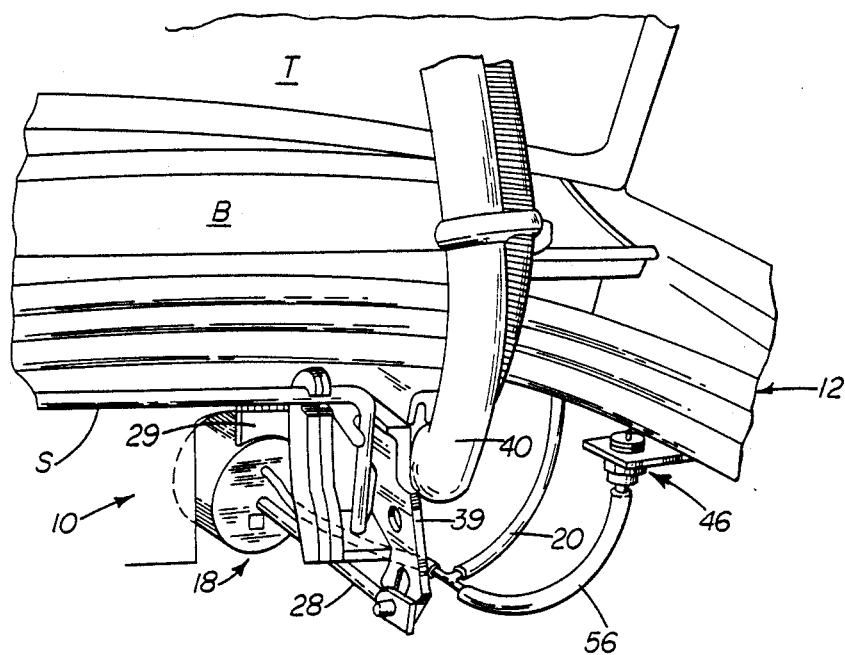
Fig. 1
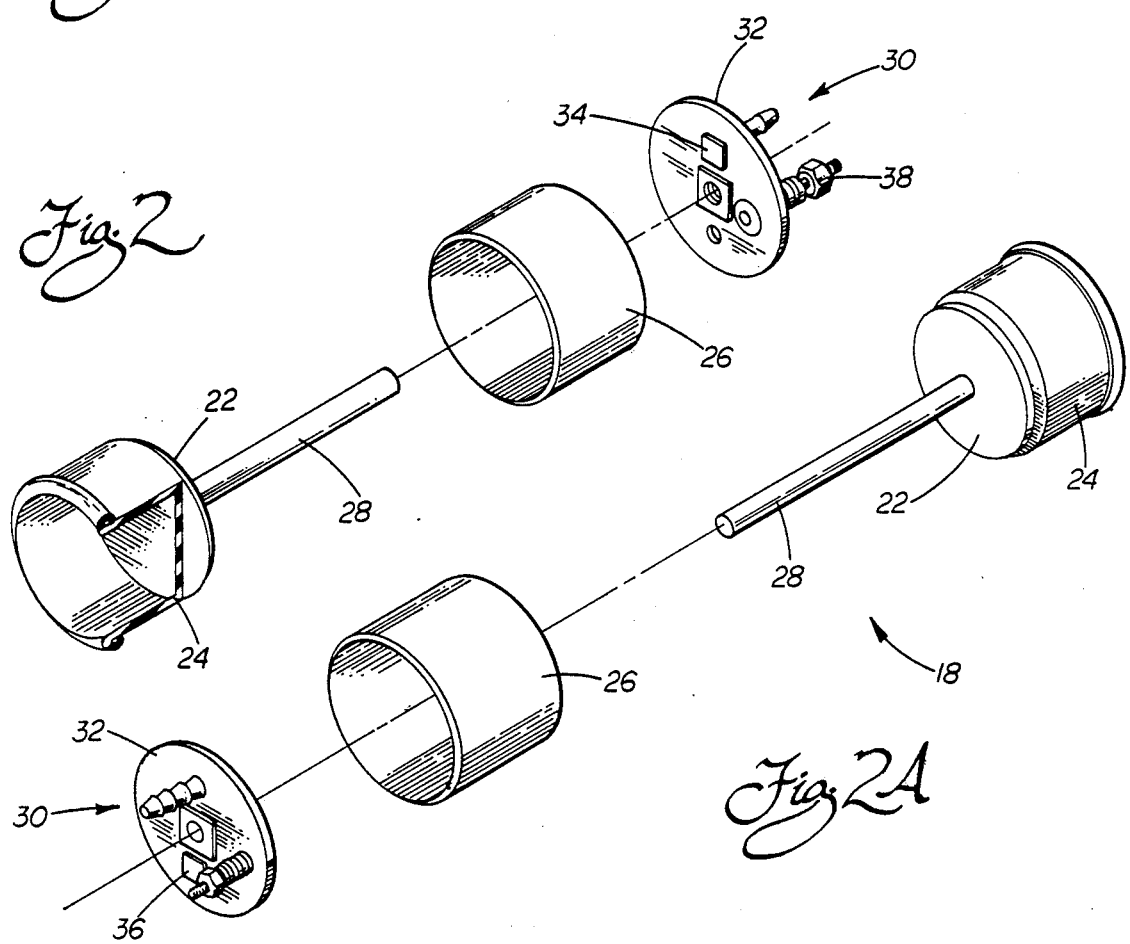
Fig. 2
Fig. 2A

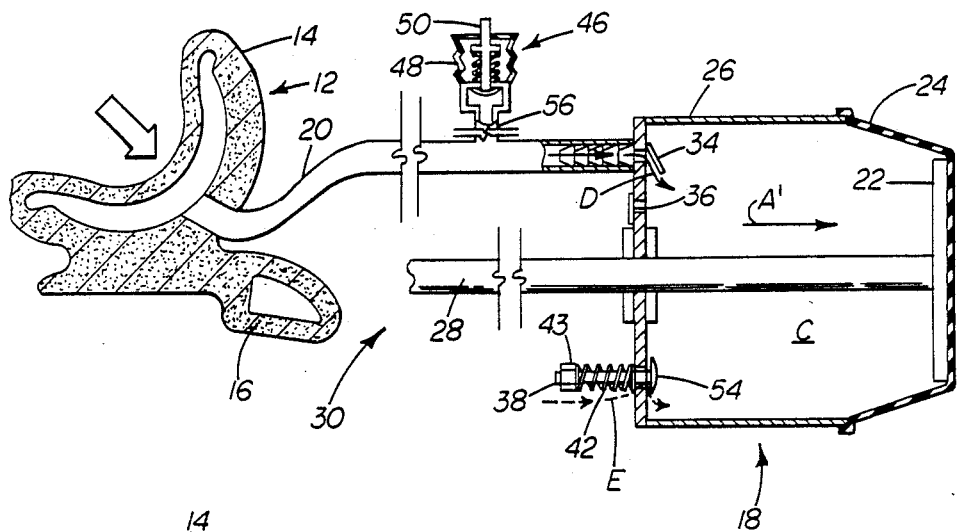
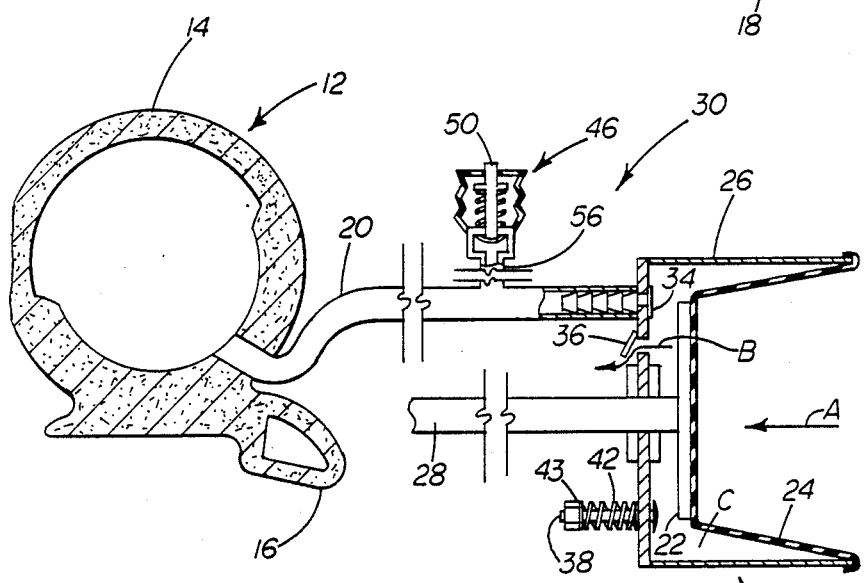
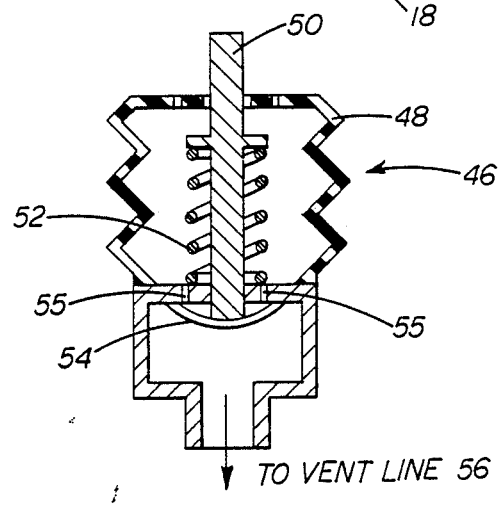

ROLLING DIAPHRAGM SYSTEM FOR DEFLATING WEATHERSTRIPS

TECHNICAL FIELD

The present invention relates generally to the sealing of closures and, more particularly, to a sealing apparatus for a vehicle closure requiring relatively low closing effort yet providing an exceptionally firm, tight seal after closing.

BACKGROUND OF THE INVENTION

Closed cell sponge weatherstrips have been the standard for years to seal vehicle closures against the passage of air and moisture. The weathership attaches to the vehicle body or closure around the opening (e.g. door or trunk opening). The weatherstrip preferably includes a tubular section that is designed to provide an interference sealing fit between the closure and body, and a mounting section to secure the weatherstrip in place. When the door or trunk lid is closed, the weatherstrip mechanically flexes according to the degree of interference. Generally, the greater the interference, the better the sealing function obtained.

Good sealing of closures is particularly desirable in vehicles such as automobiles, in order to isolate the passengers from inclement weather conditions; namely, precipitation as well as excessively hot or cold air. Additionally, it is also important to the comfort of the passengers in minimizing the annoying problem of wind noise in vehicles traveling at speed. It should be recognized, however, that the high degree of interference of the weatherstrip between the body and the closure required for good sealing disadvantageously results in increased closing effort.

Another consideration for vehicle weatherstrip design relates to an annoying problem known as "compression shock". With improved closure sealing, the rapid closing of a door or trunk lid in an otherwise closed vehicle often results in a momentary pressure surge or air compression in the passenger compartment. In essence, air is trapped inside the compartment and cannot escape past the tight weatherstrip seals around the various closures. This problem is particularly acute in designs where the closure moves substantially transverse to the body, such as in conventional swinging doors, trunk or hatchback lids. This compression shock not only further increases the closing effort required, but also results in an unpleasant feeling to the passengers.

Attempts to reduce door closing effort have in the past resulted in reduced sealing efficiency. Conversely, past attempts to emphasize improved sealing have resulted in a need for excessive closing effort. Neither of the above conditions is favored by consumers. Thus, automotive engineers have found it necessary to compromise these conflicting engineering requirements, with the best designs heretofore carefully balancing the relationship between sealing and closing effort.

Some efforts in the past have addressed these seemingly conflicting concerns and have provided some limited improvement. For example, spaced bleed apertures have been provided along the entire length of the weatherstrip allowing free communication between the atmosphere and the center of the weatherstrip. The bleed apertures are provided so that air is not entrapped within the weatherstrip and compressed when the closure is closed. More specifically, the apertures assure that the internal air pressure remains ambient at all times. Thus, mechanical flexing of the weatherstrip remains the principal medium for sealing with this improvement. Advantageously, by eliminating air entrapment in the weatherstrip, the closing effort for a rapidly closing door is reduced. Still, it should be recognized that this approach is not effective in improving the sealing efficiency since the interference fit is not appreciably increased.

Another idea that has gained some acceptance in the automotive industry is to apply at least two weatherstrips in juxtaposition to seal together when the door or lid is closed. The engaging parts of the weatherstrips are designed to form a labyrinth seal, and as a result, some improved sealing is obtained. Of course, with this arrangement, the degree of interference fit to allow easy closing is still sorely limited, and the cost of forming the seal and ultimately the cost to the consumer is substantially increased.

Another approach that has been used with success in the aircraft and aerospace industries is to make the weatherstrips inflatable. The basic idea is that when the door is closed, a positive pressure (greater than ambient pressure) is applied inside the closed tubular weatherstrip to provide expansion against the door and the door frame. The expanded weatherstrip provides increased interference, and therefore an improved seal. As will be recognized, this approach does reduce the door closing effort and compression shock to a degree because the non-inflated weatherstrip does not engage in an interference fit with the door and the door frame until the door is closed and the superatmospheric pressure is applied.

This concept, while useful in aircraft and aerospace vehicles, presents problems when attempts have been made to adapt it to general automotive use. First, in order to provide a closure sealing system using the superatmospheric pressure concept, a sophisticated air pressure supply system that is highly reliable must be provided. This is so since if air pressure is lost, a complete failure of the sealing function results and the interior is susceptible to damage from water leakage. Additionally, the passengers become exposed to the extremes of hot and cold atmospheric conditions and the annoyance of excessive wind noise. Furthermore, such a sophisticated air pressure system is relatively expensive, which is not conducive to the competitive pricing of a consumer product, such as an automobile.

Similarly, the superatmospheric inflated weatherstrip must not lose pressure over extended periods of time. To guard against this in an automotive system where small pinhole leaks are inevitable, especially after several years of use, supplemental means such as an electric pump would be required to periodically operate to maintain the optimum sealing pressure. Such a condition would inevitably lead to the need for an increased storage capacity of the electrical battery. Even with the increased battery size, under extended periods of inactivity of the automobile, the battery would discharge. Additionally, the superatmospheric pressure system must include relatively sophisticated regulators to compensate for variations in ambient pressure conditions, such as due to altitude and barometric pressure variations as well as temperature variations. Such additional cost adds to the prohibitiveness of using this type of system on a high volume consumer product, such as an automobile.

Another alternative is to provide a deflatable (rather than inflatable) weatherstrip, as disclosed in U.S. Pat. No. 2,908,948 to Jones. Jones teaches the use of an apparatus to deflate the weatherstrip upon opening of the closure. A piston working in a cylinder evacuates the weatherstrip. This apparatus has several drawbacks. For example, the problem of the inevitable wear and eventual leakage around the piston, especially after several years of service, is present. The piston working dry in the cylinder also provides undesirable high friction requiring a substantial force to operate. Furthermore, this increased force must be applied during opening movement according to the Jones patent, and is thus not readily adaptable to a small door, or to a trunk lid, where the opening force is applied by a counterbalancing spring. Finally, a relatively long and complicated linkage is required in the Jones system to provide the necessary stroke for providing the evacuating function.

The most effective approach to date for providing both improved sealing and easier closing of vehicular closures is set forth in U.S. Pat. No. 4,761,917 entitled "Deflatable Weatherstrips" of which I am a co-inventor. With this approach, a deflatable sealing member forms a weatherstrip to seal the opening in the vehicle body around the closure. The sealing member is connected to a vacuum source such as a bellows pump. The sealing member is deflated so as not to engage in an interference fit between the door and the closure. Unlike the Jones system, the deflation occurs during the closing movement when the manual force that can be applied is the greatest. In this manner, closing effort is reduced. Also, undesirable compression shock is eliminated. Following closing, the sealing member is vented to ambient pressure. This causes the sealing member to expand by inherent or built-in resilient memory to provide firm sealing engagement with increased resilient interference between the closure and the body.

While this approach is remarkably successful in reconciling the seemingly conflicting problems of excessive closing effort and tight sealing, the additional considerations of space limitations and design contraints led to the development of a bellows pump system which can be remotely mounted. This system is disclosed in my U.S. Pat. No. 4,805,347 entitled "Bellows System for Deflating Weatherstrips".

Here again, this approach has proven quite successful. However, in certain situations, the slightly increased opening force necessary to compress the bellows may not reflect the optimum design. In other words, a slight increase in closing force may, in certain situations, be more desirable than an increase in opening force. One example of this is with respect to trunk lids where it is more natural for the operator to apply a greater closing force. The present invention addresses this problem by providing a closure sealing system that is easier to actuate during closing movement.

SUMMARY OF THE INVENTION

Accordingly, it is a primary object of the present invention to provide a sealing apparatus overcoming the above-described limitations and disadvantages of the prior art.

Another object of the present invention is to provide a sealing apparatus for swinging vehicular closures providing the seemingly conflicting advantages of efficient evacuation of the sealing member, with reduced closing effort and excellent interference sealing.

An additional object of the present invention is to provide an apparatus for sealing vehicular closures especially adapted for smaller vehicle closures, such as trunk lids wherein opening movement is by a counterbalancing spring.

Still another object of the present invention is to provide an improved sealing apparatus including a rolling diaphragm pump actuated by closing to deflate the sealing member.

Yet another object of the present invention is to provide a system including a rolling diaphragm pump for evacuating a deflatable sealing member and including integral and fully automatic controls to regulate operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus is provided for tightly sealing a vehicular closure such as a trunk lid, swinging door or hatchback of an automobile. The apparatus includes a resilient sealing member having a deflatable tubular section. The sealing member also includes a mounting section to secure the sealing member to either the inner peripheral margin of the closure or the vehicle body around the periphery of the opening. When the trunk lid is closed and the sealing member reinflated, a tight interference seal is provided between the lid and the body, preventing the passage of air and moisture into the vehicle.

A vacuum source, in the form of a rolling diaphragm pump is connected to the sealing member. Basically, a rolling diaphragm pump is a modified pneumatic cylinder. An elastomeric diaphragm is bonded to the piston top and to the distal end of the cylinder to form a variable volume chamber. As the piston reciprocates, the diaphragm "follows" creating a reliable, friction free seal between the piston and the cylinder wall. This provides leakage free sealing and low friction characteristics coupled with long component life. These desirable qualities render the rolling diaphragm pump ideally suited to the present invention.

During operation, when the negative pressure from the rolling diaphragm pump is applied to the sealing member, the tubular section deflates and collapses to a reduced cross section. Conversely, when ambient pressure air is directed into the tubular section, the sealing member expands to full cross sectional area. This expansion is due to the built-in or inherent resilient memory of the sealing member.

The rolling diaphragm pump includes a mounting member specifically adapted for mounting the cylinder of the pump to the closure or the vehicle body. A piston rod is provided to transfer motion from the closure to the piston. The pump is preferably mounted such that when the closure is opened, the piston is drawn in a first direction to the bottom of the cylinder. When the closure is closed, the piston is forced to move in a second direction, ultimately reaching the furthest point of its travel.

A flow control circuit provides fluid communication between the deflatable sealing member, the rolling diaphragm pump and the atmosphere and means for controlling the deflation and inflation of the sealing member. Advantageously, the control circuit is self-contained and entirely automatic.

Preferably, the flow control circuit of the apparatus is designed so that negative pressure is applied to deflate the sealing member as the closure is closed. With the sealing member deflated and thus collapsed, the degree of interference between the sealing member and the closure is reduced, or even substantially eliminated. Thus, the force required to overcome the interference and latch the closure is advantageously reduced. Consequently, a desirable, relatively low closing effort is all that is required. Additionally, due to the reduced cross section of the sealing member, a space exists between the sealing member and the closure. This space allows for the substantially free passage of air which escapes from the zone of high pressure that would otherwise be created within the interior of the vehicle as a closure is slammed shut. Thus, the frequently unpleasant problem of compression shock, characteristic of many prior art closure sealing systems is avoided.

After the closure is closed, the control circuit readmits air at ambient pressure to the sealing member. Due to an inherent resiliency, the sealing member expands to provide the desired interference sealing engagement. Advantageously, the sealing member may, in fact, be designed to provide increased resilient interference for better sealing action without increasing the closure force as would otherwise be necessary with the closed cell sponge weather stripping of the prior art.

Preferably, the flow control circuit connecting the rolling diaphragm pump, deflatable sealing member and the atmosphere includes four valves. An intake valve and exhaust valve are connected to the rolling diaphragm pump. In the preferred embodiment, these valves are one-way type flapper valves known in the art. An atmospheric vent valve is also provided. this valve vents the deflatable sealing member to the atmosphere after closure. Thus, a supply of air is directed at atmospheric pressure to the deflated sealing member, allowing free reinflation.

A vacuum limiter valve is also provided. This valve opens when necessary to maintain the vacuum level within the rolling diaphragm pump/sealing member below a predetermined maximum limit. Advantageously, this valve assures that the required force to close the closure is maintained below a maximum level, thus, contributing to overall ease of operation.

As the closure is closed, the volume of the pump chamber is increased and air is drawn in from the tubular section of the sealing member. This, of course, serves to deflate the sealing member. In the event the sealing member is fully deflated before the closure is fully closed, additional closing movement would serve no useful purpose. Such movement would instead serve as a detriment to the efficient operation of the system. That is, there would be an undesirable ever increasing resistance or increase in the required closing force caused by the excessive vacuum.

The vacuum limiter valve operates to avoid this problem. More particularly, once the pressure within the pump chamber drops to a certain level proportional to a selected maximum desirable closing effort, the limiter valve opens. Atmospheric air is then allowed to enter the chamber as necessary to limit the vacuum and maintain the closing effort at a relatively constant level below that selected maximum level. Smoother operation and customer satisfaction are thereby assured.

In the preferred embodiment, the vacuum limiter valve is a spring loaded umbrella type valve. Advantageously, the vacuum limiter valve maintains the same desirable closing force in a wide variety of vehicle applications and sealing member configurations without resort to different size rolling diaphragm pumps, for example. This helps reduce the cost both to the manufacturer and the consumer.

The apparatus of the present invention provides the advantages of reduced closing effort, elimination of compression shock and a higher integrity seal for vehicular closures. Further, these advantages are provided by using inexpensive and reliable mechanical valves and rolling diaphragm pump. The pump may be conveniently mounted in a number of areas within the vehicle, such as tucked in a pocket of otherwise unuseable space behind the trunk lid arm, or in a cavity in the closure or closure jam adjacent the hinge area. Thus, the apparatus of the present invention may be readily incorporated into vehicles as presently designed. Here again, this allows relatively inexpensive implementation, lowering the cost to the consumer.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious asspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing:

FIG. 1 is a perspective view of the apparatus of the present invention shown installed in a trunk of a vehicle, the sealing member being adapted for sealing between the trunk lid and the vehicle body;

FIGS. 2 and 2A show front and rear exploded perspective views of the rolling diaphragm pump of the present invention;

FIG. 3 is a schematic representation showing the apparatus of the present invention during closing of the closure;

FIG. 4 is a schematic representation showing the apparatus of the present invention during opening of the closure;

FIG. 5 is a cross sectional view of the vacuum limiter valve of the present invention;

Figure 6:
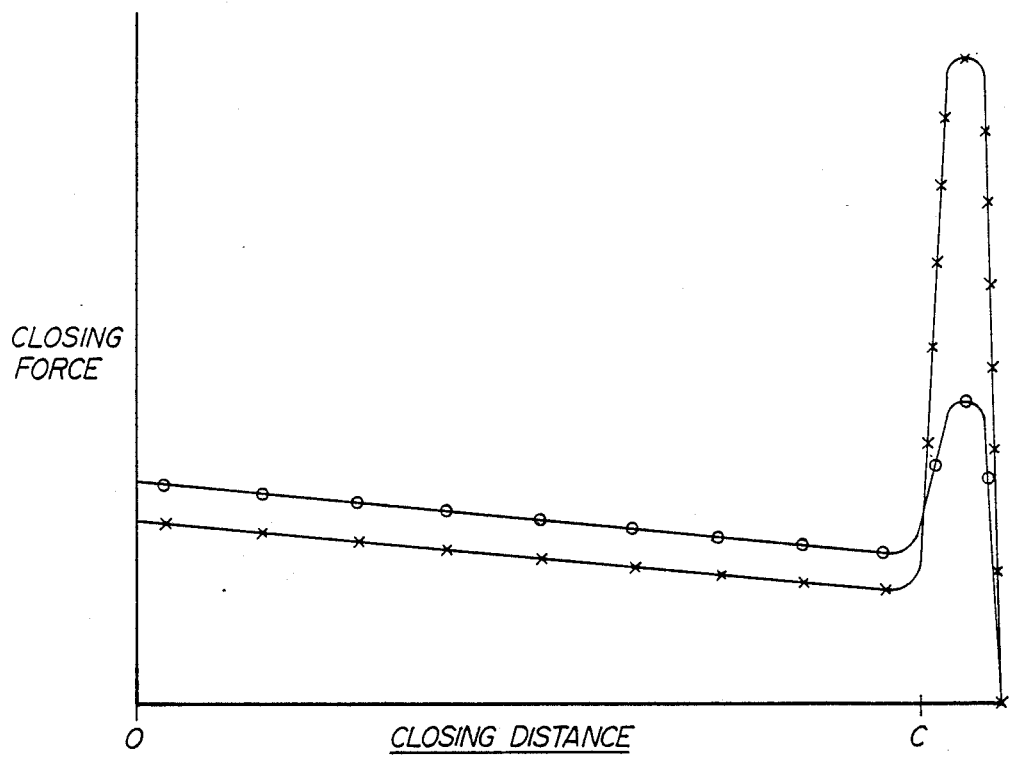
FIG. 6 is a graph illustrating closing force versus trunk lid closing distance for the apparatus of the present invention with a comparison to a state-of-the-art closed cell weather stripping system.

Reference will now be made in detail to the present preferred embodiment of the invention, an example of which is illustrated in the accompanying drawing.

DETAILED DESCRIPTION OF THE INVENTION

Reference is now made to the drawing figures showing the system or apparatus 10 of the present invention for tightly sealing a closure, such as a trunk lid T on an automobile. As best shown in FIGS. 1, 3 and 4, the apparatus 10 includes a sealing member or weatherstrip 12 having a closed tubular section 14. The sealing member 12 is mounted to the trunk lid T or the vehicle body B by means of a mounting section 16. A one way clip (not shown), adhesive or any other appropriate means known in the art may be utilized to secure the sealing member 12 in place.

The sealing member 12 is constructed of EPDM or other elastomeric material. In this way, the sealing member 12 is provided with sufficient resiliency to furnish a tight sealing engagement with the trunk lid T when in the closed position with the sealing member 12 expanded by venting to atmosphere. Since the sealing member 12 forms a ring around the entire periphery of the opening, complete sealing of the opening is provided. As a result, the passage of air and moisture between the trunk lid T and the body B is prevented.

As shown in FIGS. 1, 3 and 4, the sealing member 12 is connected to a rolling diaphragm pump 18 by means of an air flow line 20. As a result of the action of the rolling diaphragm pump 18, air travels through the line 20 into and out of the sealing member 12.

Advantageously, the rolling diaphragm pump 18 provides an efficient and relatively economical means for deflating the sealing member 12. Basically, and as shown in FIGS. 2 and 2A, the rolling diaphragm pump 18 includes a piston 22 received within a cylinder 26. A resilient diaphragm 24 is bonded to the piston 22 and the distal end of the cylinder 26. Thus, a variable volume chamber C is formed by the diaphragm 24, piston 22 and cylinder 26.

A piston rod 28 is attached to the piston 22. The piston rod 28 is actuated by the movement of the trunk lid T for reciprocation of the piston 22 relative to the cylinder 26. As the piston 22 reciprocates, the diaphragm 24 follows to vary the volume of the chamber C with a minimum of friction in a highly efficient manner. Indeed, the diaphragm pump completely eliminates sliding contact and breakaway friction. The unit is compact so as to easily fit within the space directly behind the hinge assembly (see FIG. 1). At the same time, a relatively long piston stroke assures full vacuum pumping capability. These features make the rolling diaphragm pump 18 ideally suited for use in the apparatus 10 of the present invention. Most significantly, it does not significantly add to the effort needed to open and close the trunk lid T, as will be seen more in detail below.

A flow control circuit 30 provides fluid communication between the deflatable sealing member 12, the rolling diaphragm pump 18 and the atmosphere. Advantageously, the control circuit 30 is self-contained and entirely automatic with the trunk lid operation. As shown in FIGS. 2 and 2A, the control circuit 30 is mounted integrally on the cylinder 26 and end plate 32.

The control circuit 30 includes air flow line 20, intake and exhaust check valves 34 and 36, respectively, and vent valve 46. Advantageously and as is known in the art, the check valves 34 and 36 are one-way flapper valves, providing long life and reliable operation. During operation, ambient air enters and exits the pump 18 and the sealing member 12 through these valves.

As shown in FIG. 1, the hinge assembly for the lid T includes a mounting bracket 29 for the cylinder and an actuator arm 39 pivotally attached to the cylinder 26. The precise configuration and location of the actuator arm 39 and the length of the piston rod 28, as well as the size and configuration of other components can be varied to uniquely tailor the system 10 of the present invention for use in a wide variety of vehicle applications. The small size and light weight of the rolling diaphragm pump 18 even allows mounting within the closure, such as a vehicle door, if desired.

The piston rod 28 is attached to the lower end of the arm 39 by a pivot pin and slot combination to provide relatively linear movement (see FIG. 1). The arm 39 is rigidly attached to the trunk lid support arm 40. As the trunk lid T is raised, the arm 40 rotates upwardly urged in that direction by a torsion bar spring S. The arm 39 follows, thereby moving the piston rod 28, and the piston 22 is drawn within cylinder 26 in the direction of action arrow A. As shown in FIG. 4 by the action arrow B, the volume of the chamber C decreases and air within the chamber is exhausted to the atmosphere through the exhaust check valve 36. This removes air from the pump 18 in preparation for the vacuum cycle and hence deflation of the sealing member 12.

Upon closing of the trunk lid T, the arm 39 moves the rod 28 and the piston 22 in a second, opposite direction (see action arrow A' in FIG. 3). As the piston 22 moves, the volume of the chamber C increases. Atmospheric air is prevented from entering the cylinder by the one-way action of the exhaust check valve 36. Thus, as shown in FIG. 3, air is drawn (see action arrow D) from the sealing member 12 through the air flow line 20 and the check valve 34 into the chamber C. Accordingly, the tubular section 14 of the sealing member 12 deflates to a reduced cross section. With the sealing member 12 deflated and thus collapsed, the degree of interference between the sealing member 12 and the trunk lid T is reduced or even eliminated. Thus, the force required to overcome the interference and latch the trunk lid T is advantageously reduced. Consequently, a desirable, relatively low closing effort is all that is required.

During closing of the trunk lid T, a vacuum limiter valve 38 maintains the vacuum within the chamber C and the sealing member 12 below a desired maximum. It can be seen that during closing, as the volume within the chamber C increases, the tubular section 14 of the sealing member 12 gives up its volume of air and deflates accordingly. This "exchange" of air is accomplished with a relatively low input of force. The vacuum limiter valve 38 is provided to assure that if the tubular section 14 achieves full deflation prior to complete closing of the trunk lid T, a sudden increase in the closing force is avoided. This increase would, of course, arise from the additional force necessary to further reduce the air pressure within the chamber C. In other words, once deflated, there is no more air available to flow from the tubular section 14 into the chamber C. Further movement of the piston 22 in this condition is met with continuously increasing resistance, because the internal pressure of chamber C is forced further and further below atmospheric pressure. To counteract this, the vacuum limiter valve 38 opens to allow air into the chamber C and thereby moderate the negative pressure and facilitate further piston 22 travel at substantially the same low force level. (see the dotted arrow E in FIG. 3).

As shown in FIG. 3, the vacuum limiter valve 38 is pre-loaded by spring 42. An adjusting nut 43 is provided to tension the spring 42 to the desired pre-load. During operation, when the vacuum force on the head 44 of the valve 38 exceeds the pre-load, the valve 38 opens to allow atmospheric air to enter the chamber C. Thus, the desirable low closing effort is assured. Reinflation of the sealing member 12 is prevented, however, as the spring tension serves to hold the valve 38 closed.

As the trunk lid T latches, the atmospheric vent valve 46 is actuated (see FIGS. 1 and 5). As shown, the valve 46 includes a resilient accordian cover 48 that protects the valve from dirt and external damage. When the trunk lid T latches, it engages the distal end of the plunger 50. The plunger 50 is thus forced downwardly against the action of the spring 52. As this occurs, the umbrella head 54 is moved away from its seat exposing the vent apertures. This allows atmospheric air to flow into the system.

More specifically, air flowing into the valve 46 around the plunger 50 moves through vent apertures 55, vent line 56 and thus into the flow line 20, the chamber C and the sealing member 12. As a result, the tubular section is reexpanded by its resilient memory to full cross section (see FIG. 4) to provide a tight, interference seal between the trunk lid T and the body B.

When the trunk lid T is subsequently opened, the spring 52 biases the plunger 50 upwardly to move the umbrella head 54 back into the seated position over the vent apertures 55. Thus, the flow control circuit and, therefore, the sealing member 12 is again isolated from ambient air in readiness for the next operation cycle.

The advantage of utilizing the apparatus 10 of the present invention over the standard closed cell type sponge weatherstrip commonly used on vehicles today is dramatically illustrated in FIG. 6. FIG. 6 is a graph illustrating closing force of a trunk lid versus distance. In the graph, the closing force is plotted on the ordinate (y axis), the closing distance on the abscissa (x axis). As shown, the force necessary to close the vehicle trunk lid T with the apparatus 10 of the present invention is initially slightly greater. This is due to the small additional force necessary to operate the rolling diaphragm pump 18.

The necessary closing force decreases as a function of distance during closing, but remains slightly greater than that closing force required for the standard weatherstripping system. This trend continues until the weatherstrip is contacted. As the graph shows, at this point (designated C), the force necessary to close and latch the trunk lid of a vehicle equipped with the standard weatherstripping system increases dramatically. This sudden, substantial increase in required closing force is undesirable, and even annoying to many consumers.

As shown, the present system avoids this problem by significantly reducing this peak closing force at C. Furthermore, a relatively insignificant rise in the required closing force is all that is experienced as the closure latches. Thus, smoother, more consistent operation is achieved. Further, a lower overall closing force is required to the satisfaction of consumers. In addition, when the sealing member 12 reexpands by resiliency, improved interference sealing is provided. Thus, the benefits of both easier closing and better sealing are obtained.

Although the apparatus 10 of the present invention was described in relation to a vehicle trunk lid, it should be emphasized that the apparatus 10 can be utilized on all vehicle closures including swinging vehicle doors. Advantageously, the small size and light weight of the apparatus 10 of the present invention allows the designer wide latitude in specific configurations. For example, the rolling diaphragm pump 18 can be mounted within the vehicle door or even within the door frame, if desired.

In summary, numerous benefits have been described which result from employing the concepts of the present invention. Advantageously, the apparatus 10 of the present invention is specially adapted to provide swinging vehicular closures that require reduced effort while also providing good interference sealing. As the trunk lid T is closed, the sealing member 12 is deflated to reduce interference engagement and allow closing and latching of the trunk lid with less effort. Further, at the instant of closing, air flows past the sealing member 12 so that the annoying problem of compression shock is substantially eliminated. Immediately upon closing, the sealing member 12 is vented to atmosphere, allowing expansion by resilient memory to full cross section. This provides the desirable interference sealing engagement with the trunk lid for maximum sealing.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, a spring can be utilized to bias the piston 22 in the first direction to provide the force necessary to exhaust the chamber C to the atmosphere during opening of the trunk lid T. During closing, the arm 39 pushes against the piston rod 28 to provide the evacuating force. Advantageously, this spring can be sized to replace the standard torsion rod spring S presently utilized to keep the trunk lid T open, thereby facilitating installation in cramped areas such as found in today's compact cars. The preferred embodiment was chosen and described to provide the best illustration of the principals of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. An apparatus for sealing between a closure and a body such as a trunk lid and body of a vehicle, comprising:
    a deflatable sealing member providing resilient interference engagement between said closure and said body;
    vacuum source means in the form of a rolling diaphragm pump for deflating said sealing member;
    means connected to said closure to actuate said rolling diaphragm pump in response to movement of said closure; and
    flow control means including an exhaust check valve and an intake check valve for regulating flow into and out of said pump, a flow line connected between said intake check valve and said sealing member for deflating said sealing member, and an atmospheric vent valve connecting said flow line to the atmosphere, said atmospheric vent valve being actuated to inflate said sealing member upon closing of said closure; said flow control means further including vacuum limiter means for limiting the vacuum in said rolling diaphragm pump during operation so as to maintain relatively low closing effort of said closure when there is no further available air flow from said sealing member to said pump.

2. An apparatus as defined in claim 1 wherein said vacuum limiter means comprises a vacuum limiter valve that opens to allow atmospheric air to enter said pump in response to the establishment of a predetermined subatmospheric pressure in said pump.

3. An apparatus as defined in claim 2 wherein said vacuum limiter valve comprises a valve element that is exposed to the interior of said pump and is normally held closed by a preloaded spring.

* * * * *